G. GRECO.
RESILIENT WHEEL.
APPLICATION FILED JUNE 17, 1916.
1,208,948.
Patented Dec. 19, 1916.
2 SHEETS—SHEET 1.
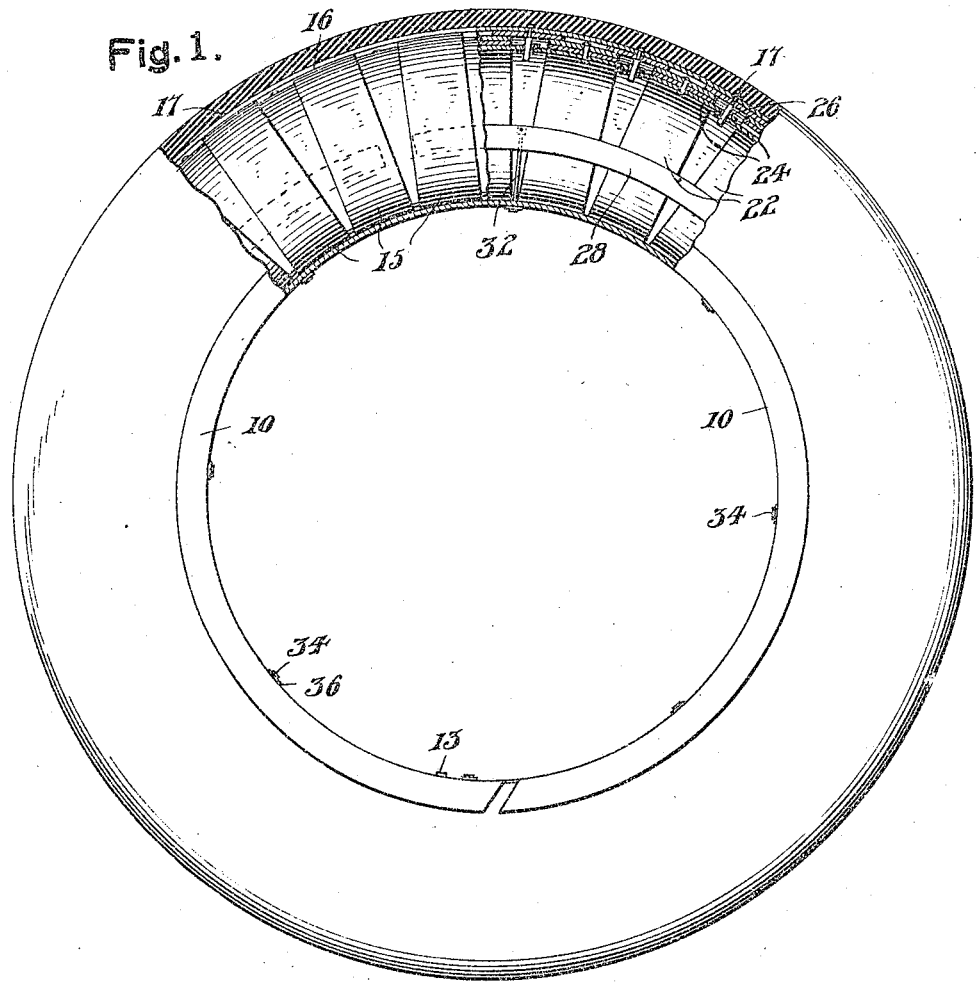
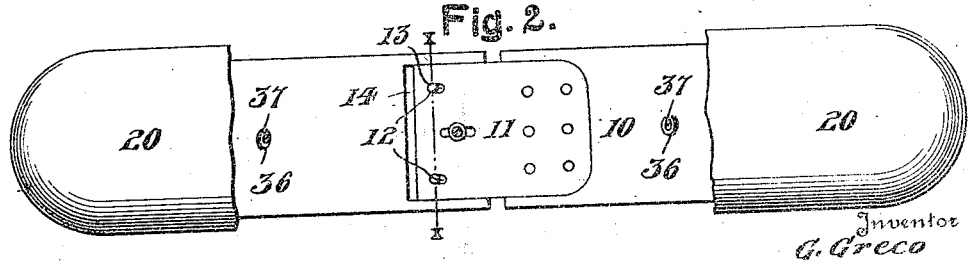

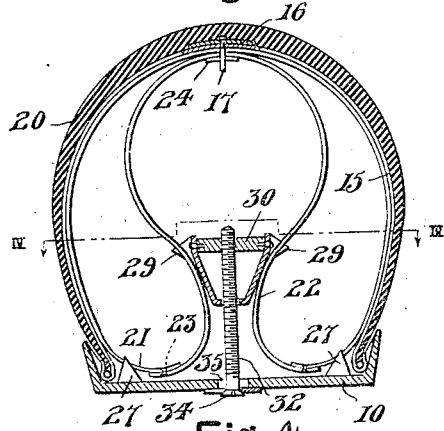
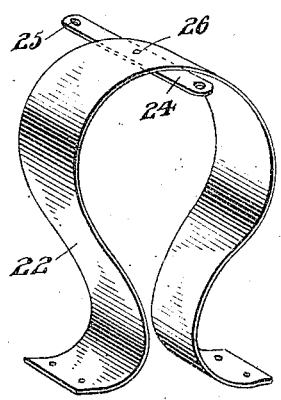
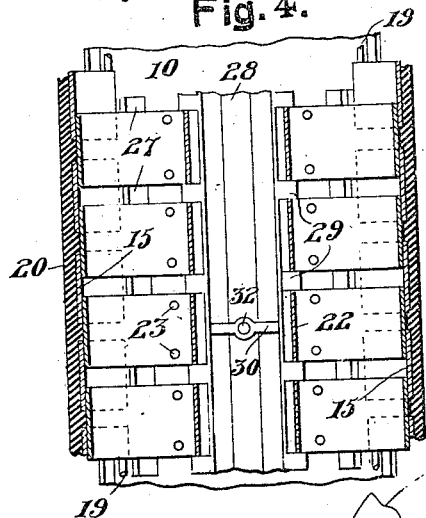
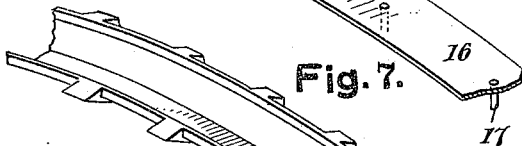
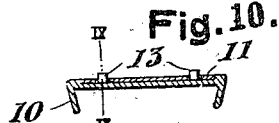
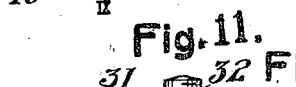
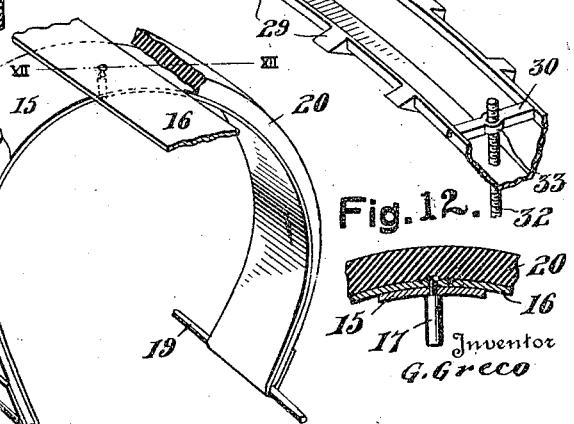

UNITED STATES PATENT OFFICE.

GAETANO GRECO, OF PITTSBURGH, PENNSYLVANIA.

RESILIENT WHEEL.

1,208,948. Specification of Letters Patent. Patented Dec. 19, 1916.

Application filed June 17, 1916. Serial No. 104,215.

*To all whom it may concern:*

Be it known that I, GAETANO GRECO, a subject of the King of Italy, residing at Pittsburgh, in the county of Allegheny and State of Pennsylvania, have invented certain new and useful Improvements in Resilient Wheels, of which the following is a specification.

This invention relates to new and useful improvements in resilient wheels.

The primary object of the invention is the provision of a vehicle wheel furnishing suitable resiliency under load conditions and eliminating the use of an inner tube or rubber cushioning member, spring means being substituted therefor incapable of being punctured and possessing great wearing properties.

A further object of the device is to provide a wheel having a rim mounted casing arranged with a sectional spring filling member adjustably tensioned therein, whereby the properties of the usual pneumatic tire are imparted to the device in which punctures and blow-outs are impossible.

In carrying out the present objects, a sectional plate having a rubber envelop constitutes the shoe member being adapted for removable positioning upon a collapsible rim, a plurality of interengaging filling springs being positionable within the said shoe member, a sectional tensioning device for the filling springs being arranged therefor operable inwardly of the rim.

In the drawings forming a part of this application and in which like designating characters refer to corresponding parts throughout the several views:—Figure 1 is a side elevation of the rim and tire of a wheel of the present form partially broken away. Fig. 2 is a top plan view of the same partially broken away. Fig. 3 is a transverse sectional view. Fig. 4 is a longitudinal sectional view taken upon line IV—IV of Fig. 3. Fig. 5 is a perspective view of a section of one of the filler springs employed with the device. Fig. 6 is a perspective view of a portion of the connecting tread plate for the arched spring plate sections. Fig. 7 is a perspective view of a portion of one of the locking channel bars for the filler springs. Fig. 8 is a perspective view of one of the arched spring plates and the adjacent members, parts being broken away. Fig. 9 is a sectional view enlarged taken upon line IX—IX of Fig. 10. Fig. 10 is a transverse sectional view taken upon line X—X of Fig. 2. Fig. 11 is an enlarged detail sectional view of a portion of the mounting means for the channel bar. Fig. 12 is an enlarged detail sectional view through a portion of the complete shoe member, and Fig. 13 is a perspective view of a washer employed with the device.

Referring more in detail to the drawings, a rim 10 is provided of substantially the usual channel shape in cross section, the same however being in the form of a split ring having one of the ends thereof provided with a connecting plate 11 having perforations 12 for receiving hooks 13 upon the depressed portion 14 of the adjacent end of the rim whereby the rim is arranged in circular formation adapted to be positioned upon the felly of a wheel in the usual manner.

A plurality of arched spring plates 15 are provided having their central portions connected together by a tread plate 16 by means of suitable pins 17 whereby the plates are arranged in spaced relations, it being understood that the tread plate 16 has its ends slightly relatively movable. The opposite ends 18 of the plates 15 are overturned for the reception of locking wires 19 which are positioned inwardly of the opposite flanges of the rim 10, the plates 15 and tread plate being covered by an envelop 20 of rubber and forming therewith a complete tire shoe. Resilient filling members are provided for the said shoe, each consisting of two spring sections 21 and 22, the former being a hoop member and the latter a loop member or section, the said sections 21 and 22 being secured together at their bases or ends by rivets 23, each hoop and loop section thereby forming a resilient filled member or spring. Each of the loop sections 22 is provided with a link 24 secured to its central portion interiorly thereof, the links having openings 25 adjacent their ends adapted for freely receiving the aforementioned pins 17, it being understood that rivets 26 connect the central portions of the hoop sections 21 with the central portions of the loop sections 22 as well as securing the links 24 to the same.

Spacing lugs 27 are carried by the rim 10 being arranged between the adjacent hoop section 21 for spacing the filler members apart. A plurality of locking bars 28 are arranged interiorly of the loops 22 in wedging contact therewith, the same being of channel shape in cross-section with their opposite sides inwardly tapered toward the rim 10 affording wedging surfaces in contact with the opposite sides of the loops 22. Spacing lugs 29 are oppositely arranged upon the locking bars 28 for positioning between the adjacent loops 22 and spacing the latter apart.

Connecting yokes 30 are pivoted upon trunnions 31 between the opposite marginal edges of the locking bars 28, while adjusting screws 32 are threaded through the central enlarged portions 33 of the yokes 30 and extend radially with their heads 34 extending through perforations 35 in the rim 10. In order that the adjusting screws 32 may be readily inserted into the locking bars 28, the perforations 35 are made relatively large as regards the diameter of the screws, so that the latter may be moved about in said openings 35 to find the threaded openings in bars 28. When they are inserted in the bars, they are then held at their headed end by washers 36 each having a slot 37 to receive the screw shank, the washers being larger than the openings 35 and being engaged with the screws between the heads thereof and the rim 10. The turning of the screws in or out will increase or decrease the wedging action of the bars 28 on springs 22 to vary the tension of the latter.

From this detailed description of the invention, the complete operation thereof will be at once apparent, it being understood that the shoe is arranged upon the rim 10 as best illustrated in Figs. 1 and 3 of the drawings. Prior to such positioning of the shoe, the filler spring members consisting of the hoops 21 and loops 22 are positioned therein with the links 24 in overlapping arrangement mounted upon the pins 17. The locking bars 28 are then arranged within the loop sections 22, the bar lugs 29 and rim lugs 27 suitably spacing the filler members apart. The screws 32 are then inserted through the openings 35, and engaged with the locking bars, and the washers 36 are placed on the screw shanks, and the screws turned to provide the desired tension on the filling members and give the required degree of resiliency to the entire tire formation.

It will be understood that the rim 10 may be mounted in any desired manner upon any form of wheel felly desirable and while the present form of the device is believed to be the preferable embodiment thereof, it will be understood that minor changes may be made therein without departing from the spirit and scope of the invention as claimed.

What I claim as new is:—

1. A resilient wheel comprising a rim, a rubber shoe mounted thereon, a plurality of filler springs arranged within the shoe, spacing means for the said filler springs, a plurality of wedging tensioning bars within the said springs and an adjusting means for the said bars.

2. A resilient wheel comprising a split rim, a plurality of spaced arched spring plates mounted upon said rim, a connecting tread plate centrally engaging the said arched plates, inwardly projecting radial pins attached to the said arched and tread plates, binding wires engaging the opposite ends of the said arched plates positioned adjacent the said rim, a rubber envelop for the said arched plate and tread plate and spring filler members mounted interiorly of the said arched plates and loosely connected to the said pins.

3. A resilient wheel comprising in combination with a split rim, a shoe comprising a plurality of spaced arched spring plates mounted upon said rim, a connecting tread plate centrally engaging the said arched plates, inwardly projecting radial pins connecting the said arched plates and tread plate, binding wires engaging the opposite ends of the said arched plates positioned adjacent the said rim, a rubber envelop for the said arched plates and tread plate, and resilient filler members within said shoe.

4. In a resilient wheel, the combination with a sectional rim having central perforations, and lugs upon said rim, of a shoe mounted in said rim comprising arched spring plates, a tread plate connecting the arched plates, and a tread member inclosing the arched plates and tread plate, resilient filler members arranged within said shoe and spaced apart by the lugs of said rim, locking bars engaging said resilient filler members, and adjusting screws extending through said perforations in the rim and engaging said locking bar for adjusting the tension of said filler members.

5. A resilient wheel comprising a shoe embodying a tread member, and arched spring plates within said tread member, filler springs arranged within the shoe contacting the sides thereof and having centrally arranged loops, tensioning means positioned within the said loops, and loose connections between the said filler springs and the arched plates of said shoe.

6. A resilient wheel comprising a rim, a shoe upon the said rim, inwardly projecting radial pins carried by said shoe, filler springs arranged within the said shoe, connecting links for the said springs loosely connected to the said pins, and adjusting means for the said springs.

7. A resilient wheel comprising a shoe, spring fillers within the said shoe providing centrally arranged resilient loops, loose link connections between the said loops, channel bar locking means within the said loops, and screw adjusting means for the said locking means.

8. A resilient wheel comprising a rim, a shoe upon the said rim, resilient loops within the said shoe, loose connections between the said loops, locking bars within the said loops, spacing lugs for the loops upon the said locking bars, spanning yokes swivelly mounted upon the said bars, adjusting screws extending through the said bars in threaded engagement with the said yokes and bearing support members for the said screws.

In testimony whereof I affix my signature.

GAETANO GRECO.